(12) United States Patent
Krishna et al.

(10) Patent No.: US 11,657,142 B2
(45) Date of Patent: May 23, 2023

(54) STATELESS PASSWORD MANAGER

(71) Applicant: MICRO FOCUS LLC, Santa Clara, CA (US)

(72) Inventors: Vamsi Krishna, Bangalore (IN); Guruprasad Sathyamurthy, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 22 days.

(21) Appl. No.: 17/318,484

(22) Filed: May 12, 2021

(65) Prior Publication Data

US 2022/0366033 A1    Nov. 17, 2022

(51) Int. Cl.
*G06F 21/46* (2013.01)

(52) U.S. Cl.
CPC ............................. *G06F 21/46* (2013.01)

(58) Field of Classification Search
None
See application file for complete search history.

(56) References Cited

U.S. PATENT DOCUMENTS

| | | | |
|---|---|---|---|
| 7,434,061 B2 | 10/2008 | Moseley | |
| 9,021,268 B2 | 4/2015 | Dharmarajan | |
| 10,079,687 B2 * | 9/2018 | Mishra | .................. H04L 9/3226 |
| 10,091,188 B2 | 10/2018 | Xiao et al. | |
| 10,715,320 B2 * | 7/2020 | Hu | ........................ H04L 9/3242 |
| 2002/0087890 A1 * | 7/2002 | Chan | ....................... G06F 21/41 |
| | | | 726/5 |
| 2005/0071645 A1 * | 3/2005 | Girouard | ................. G06F 21/31 |
| | | | 713/183 |
| 2005/0132203 A1 * | 6/2005 | Dharmarajan | .......... G06F 21/46 |
| | | | 726/19 |

(Continued)

FOREIGN PATENT DOCUMENTS

| | | |
|---|---|---|
| CN | 107071157 A | 8/2017 |
| CN | 112329003 A | 2/2021 |

OTHER PUBLICATIONS

Al Maqbali F, Mitchell CJ. AutoPass: An automatic password generator. In2017 International Carnahan Conference on Security Technology (ICCST) Oct. 23, 2017 (pp. 1-6). IEEE. (Year: 2017).*

(Continued)

*Primary Examiner* — James R Turchen
(74) *Attorney, Agent, or Firm* — Sheridan Ross P.C.

(57) ABSTRACT

A first application name is received. For example, the first application name may be the name of the application, a Universal Resource Locator (URL) of a web site (e.g., microfocus.com), and/or the like. The first application name represents a computer application of a plurality of computer applications that the user logs into. A global password is received from the user. The global password is used as a seed to login to the plurality of computer applications. The global password is converted to a phonetic password. A first application password is generated for the first computer application based on the first application name and the phonetic password. For example, the first application name and the phonetic password are used as an input to a key deviation function. The first application password is then displayed to the user. The user can then use the displayed password to login to the first application.

20 Claims, 3 Drawing Sheets

(56) References Cited

U.S. PATENT DOCUMENTS

| | | | | |
|---|---|---|---|---|
| 2007/0113294 | A1* | 5/2007 | Field | H04L 63/083 |
| | | | | 726/27 |
| 2007/0245149 | A1* | 10/2007 | Lin | H04L 9/0662 |
| | | | | 713/184 |
| 2010/0106975 | A1* | 4/2010 | Vandervort | H04M 3/4936 |
| | | | | 713/186 |
| 2013/0254875 | A1* | 9/2013 | Sama | G06F 21/31 |
| | | | | 726/19 |
| 2016/0301533 | A1* | 10/2016 | Mishra | H04L 63/083 |
| 2017/0091441 | A1* | 3/2017 | Moore, Jr. | H04L 9/3226 |
| 2017/0169211 | A1* | 6/2017 | Gao | H04L 63/083 |
| 2017/0193216 | A1* | 7/2017 | Lucas | H04L 63/083 |
| 2017/0279788 | A1* | 9/2017 | Rosenblum | H04L 63/083 |
| 2018/0300473 | A1* | 10/2018 | O'Dell | G06F 21/46 |

OTHER PUBLICATIONS

Phonetic Matching: A Better Soundex; Alexander Beider & Stephen P. Morse; Association of Professional Genealogists Quarterly (Mar. 2010) (Year: 2010).*

Mihir Patkar; 5 Password Tools to Create Strong Passphrases and Update your Security; Aug. 27, 2019; 15 Pages.

Weining Yang, et al; An Empirical Study of Mnemonic Sentence-Based Password Generation Strategies; Purdue University; Oct. 2016; 14 Pages.

Yao Cheng, et al; Deep Mnemonic: Password Mnemonic Generation via Deep Attentive Encoder-Decoder Model; Manuscript submitted on Jun. 3, 2019; accepted on Apr. 2, 2020; 14 Pages.

* cited by examiner

STATELESS PASSWORD MANAGER

FIELD

The disclosure relates generally to computer authentication systems and particularly to stateless password generation and management for computer authentication systems.

BACKGROUND

A key security issue for computer networks and computer systems is computer security. Almost every day, the news contains headlines of some form of security breach and loss of critical information. A major problem with computer security/network security is computer passwords. A user will typically have a large number of different passwords because the user has access to a large number of web sites/applications. For example, the user may have a password for accessing a work computer network (e.g., a Virtual Private Network (VPN) password), passwords for individual applications at work, passwords for multiple web sites (e.g., for purchasing products), passwords for social networking sites (e.g., Facebook™), email passwords, and/or the like. With so many passwords, it becomes difficult for the user to remember individual passwords for each of the web sites/applications. In addition, other factors, such as, passwords that requires longer lengths, passwords that require special characters, and/or the like make remembering the passwords even more difficult.

As a result, users may reuse the same passwords, use simple passwords, or write down all the different passwords. These types of issues create major security problems for computer networks/computer systems. For example, if the user reuses a password across multiple computer sites, if one site is compromised, a hacker can then compromise other computer sites of the user. If the user uses a simple password, a hacker may be able to compromise the user's password using a password cracking program or by guessing the password. Likewise, if passwords are written down, a security breach can occur if a hacker finds the written down passwords. These types of issues have led to a large number of security breaches of computer systems/computer networks and the loss of large amounts of secure information.

In addition, because the user often forgets the passwords, this creates technical support problems where the user passwords have to be constantly reset. Hackers have compromised passwords by posing as a user who has forgotten their password, thus resulting in a security breach of a computer system/network.

SUMMARY

These and other needs are addressed by the various embodiments and configurations of the present disclosure. A first application name is received. For example, the first application name may be the name of the application, a Universal Resource Locator (URL) of a web site (e.g., microfocus.com), and/or the like. The first application name represents a computer application of a plurality of computer applications that the user logs into. A global password is received from the user. The global password is used as a seed to login to the plurality of computer applications. The global password is converted to a phonetic password and trimmed. A first application password is generated for the first computer application based on the first application name and the phonetic password. For example, the first application name and the phonetic password are used as an input to a key deviation function. The first application password is then displayed to the user. The user can then use the displayed password to login to the first application. This allows for stateless password management where the password is never stored.

In one embodiment, a version and/or user name may also be used as an input for generating the first password. For example, the user may need to periodically change the password for the first application or the user may have multiple usernames to the same application. By using the version and/or username as an input, the process generates a unique password for each version/username.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As described herein and in the claims, the term "application" may refer to any kind of application, such as a database application, a web site, network application, an operating system, a security application, a server based application, a client application, an email application, a chat application, a telephony application, a an authentication application (e.g., for a device), and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
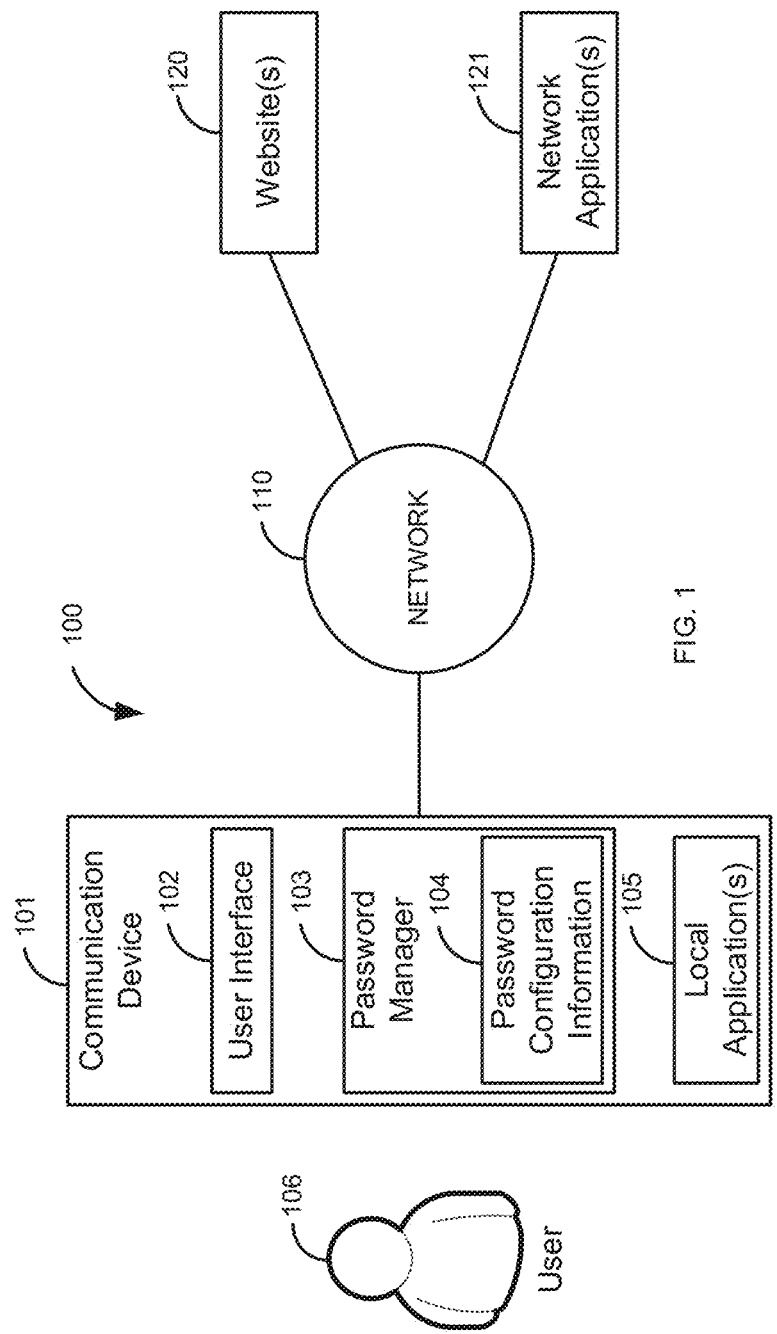
FIG. 1 is a block diagram of a first illustrative system for a stateless password manager.

FIG. 1 is a block diagram of a first illustrative system 100 for a stateless password manager 103. FIG. 1 comprises a communication device 101, a network 110, website(s) 120, and application(s) 121.

The communication device 101 can be, or may include, any computer device such as a Personal Computer (PC), a telephone, a video system, a cellular telephone, a Personal Digital Assistant (PDA), a tablet device, a notebook device, a smartphone, a server, and/or the like. Although only one communication device 101 is shown in FIG. 1, one of skill in the art would recognize that there may any number of communication devices 101 connected to the network. In addition, the communication device 101 may be a stand-alone device that is not connected to the network 110.

The communication device 101 comprises a user interface 102, a password manager 103, and local application(s) 105. The user interface 102 may comprise one or more interfaces for providing and receiving information from the user 106, such as, a display, a touch screen, a microphone, a video camera, a mouse, a keyboard, a speaker, a vibrator, an accelerometer, and/or the like.

The password manager 103 can be, or may include, any software/hardware that can manage passwords for the user 106 across multiple applications (e.g., the local application(s) 105 and the network application(s) 121) and/or the website(s) 120). The password manager 103 further comprises password configuration information 104. The password configuration information 104 may include information associated with a website 120/application 105/121. For example, the password configuration information 104 may include user name(s) associated with an application 105/121, application/website names, password version numbers (what is the version number of the current password for a particular website 120/application 105/121), and/or the like.

Figure 2:
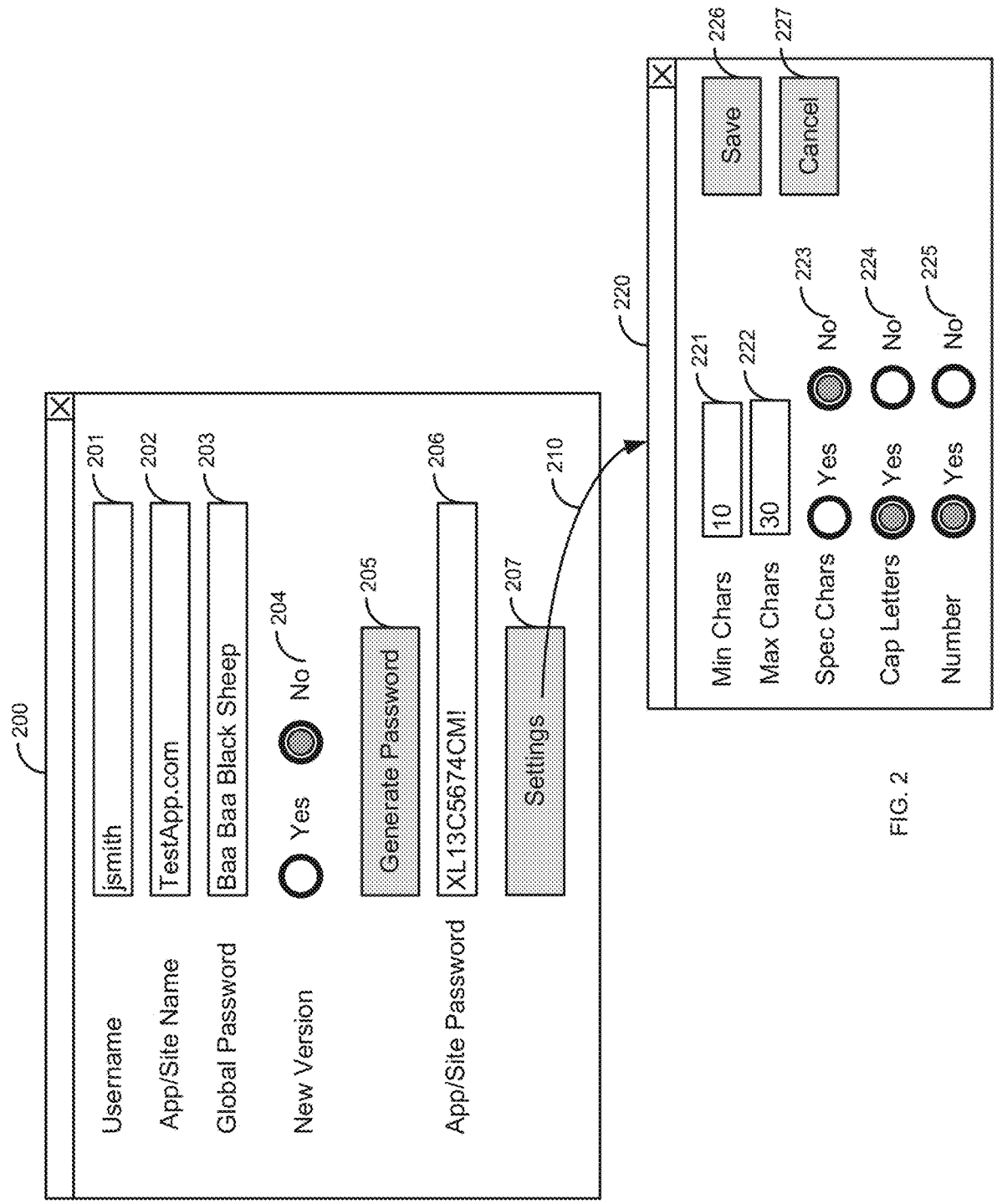
FIG. 2 is a diagram of a user interface for generating passwords across multiple websites/applications.

Although the password manager 103 is shown in the communication device 101, the password manager 103 may be hosted via a web server. For example, the password manager may provide a web page (e.g., as shown in FIG. 2) to the user on the communication device 101 to generate a password for each website 120/application 105/121.

The password configuration information 104 may also include password configuration parameters. The password configuration parameters are parameters that are required by a particular website 120/application 105/121. For example, first website 120 may require a password that is between 10 and 30 characters in length, requires a special character (e.g., !* % #etc.), has one or more capitalized letters, contain one or more numbers, and/or the like. A second website 120 may require a different set of configuration parameters. The configuration parameters are stored on a per website 120/application 105/121 basis. In addition, the configuration parameters may be stored based on a user name/website 120/application 105/121 basis. For example, the user 106 may have two email accounts on the same email server. In this example, the user 106 may have two different sets of configuration parameters for each email account. The password configuration information 104 typically will not include any stored passwords for security purposes. In other words, the password is stateless because it does not rely on or store any password/password information. This is an important advantage to other password managers that store the password. The only information that is stored is information associated with the context of where the user logs in (e.g., username, app/site name version, etc.).

The local application 105 can be, or may include, any application 105 stored on the communication device 101, such as a contacts list, a secured local application, a local database, a local gaming application, a local contacts list, a device login, and/or the like.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The website(s) 120 can be or may include any website 120 that requires a password for access, such as, a corporate web site, a social network, an email web site, a database web site, an online retail web site, and/or the like. Likewise, the network application(s) 121 may be any software/hardware application that requires a password, such as a security application, an operating system, a voicemail application, a human resource application, a sales application, an asset tracking application, an inventory application, and/or the like.

FIG. 2 is a diagram of a user interface 102 for generating passwords across multiple websites 120/applications 105/121. The user interface 102 comprises a password window 200 and a settings window 220.

Password window 200 comprises a username field 201, an app/site name field 202, a global password field 203, a version radio button 204, a generate password button 205, an app/site password field 206, and a settings button 207. The username field 201 is used by the user 106 to enter the user name that is associated with a particular website 120/application 105/121. In FIG. 2, the user 106 has entered the name "jsmith" in the username field 201.

The app/site name field 202 is the name of the website 120/application 105/121. For example, in FIG. 2, the user 106 has entered the name of a website 120 that has a Universal Resource Locator (URL) of "TestApp.com". The name in the app/site name field 202 can be associated with a local application 105 or a network application 121. For example, the name in the app/site name field 202 may be "Gamming App" for a local gamming application 105. The name in the app/site name field 202 is a field that uniquely identifies a particular website 120/application 105/121.

The global password field 203 is where the user 106 enters a global password that is used as a seed for generating an app/site password. This way, the user 106 only has to remember the global password when accessing any website 120/application 105/121. In FIG. 2, the user 106 has entered the global password "Baa Baa Black Sheep" into the global password field 203. The global password is used as a seed for generating the password for all the user's websites 120/applications 105/121.

The version radio button 204 is selected to "Yes" when a new password is needed. Many websites 120/applications 105/121 periodically require the user 106 to change the password. For example, the website 120 may require the user 106 to change the password every six months. If the website 120/application 105/121 requires a new password, the user 106 selects the "Yes" button in the version radio button. Selecting the "Yes" button in the version radio button 204 tells the password manager 103 that the generated password for the website/application 105/121 needs to be changed. In another embodiment (not shown), the user 106 may manually change a version number via a text box, a spinner, and/or the like.

The user 106 then selects the generate password button 205 to display the app/site password in the app/site password field 206. The app/site password is generated based on the app/site name and the global password. In addition, the user name and version may also be used to generate the app/site password. For example, based on the user 106 selecting the generate password button 205, the password "XL13C5674CM!" is generated for the website 120 "TestApp.com". This process is described in more detail in FIG. 3.

The user 106 may also select the settings button 207 as shown in step 210. Selecting the settings button 207 causes the settings window 220 to be displayed to the user 106 in the user interface 102. The settings window 220 comprises a minimum characters field 221, a maximum characters field 222, a special characters radio button 223, a capitalize letter radio button 224, a number radio button 225, a save button 226, and a cancel button 227. The minimum characters field 221 is where the user 106 defines the minimum number of characters required to be in the app/site password. The maximum characters field 222 is where the user 106 defines the maximum number of characters required to be in the app/site password.

The special characters radio button 223 is selected by the user 106 (to Yes) if the website 120/application 105/121 requires one or more special characters (e.g., !* % #etc.) to be in the app/site password. The capitalize letter radio button 224 is selected by the user 106 (to Yes) if the website 120/application 105/121 requires one or more letters to be capitalized in the app/site password. The number radio button 225 is selected by the user 106 (to Yes) if the website 120/application 105/121 requires one or more numbers in the app/site password.

The user 106 can save the same the password configuration parameters in the password configuration information 104 by selecting the save button 226. The password configuration parameters are stored on a per website 120/application 105/121 level. In addition, if the user 106 has multiple login names (user names) for the same website 120/application 105/121, the process can save the password configuration information 104 based on the different user names for the website 120/application 105/121. The user may also select the cancel button 227 to close the settings window 220.

Although the settings window 220 displays different password configuration parameters, one of ordinary skill in the art would recognize that other configuration parameters may be displayed depending upon implementation. For example, the user 106 may be able to enter a number for a number of special characters to be in the app/site password, a number of capitalized letters to be in the app/site password, a number of numbers to be in the app/site password, and/or the like.

Figure 3:
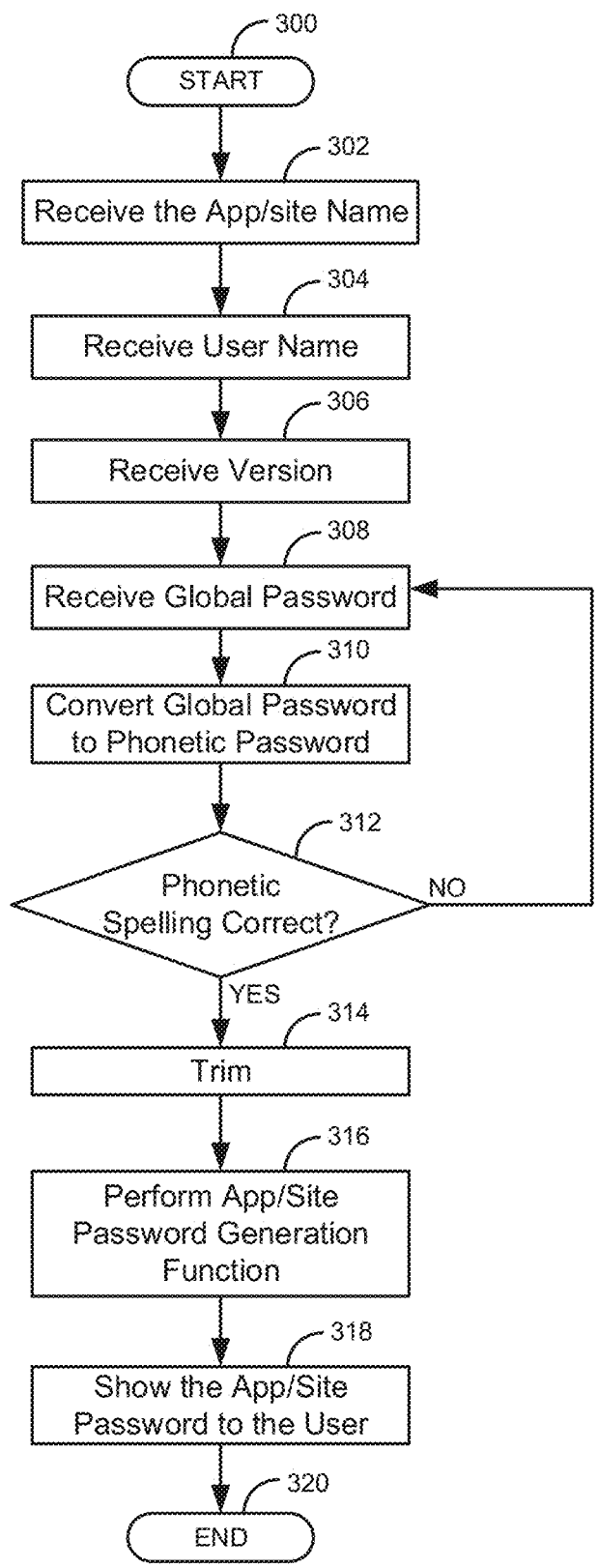
FIG. 3 is a flow diagram of a process of a process for generating passwords across multiple websites/applications.

FIG. 3 is a flow diagram of a process of a process for generating passwords across multiple websites 120/applications 105/121. Illustratively, the communication device 101, the user interface 102, the password manager 103, the local application(s) 105, the website(s) 120, and the network application(s) 121 are stored-program-controlled entities, such as a computer or microprocessor, which performs the method of FIGS. 2-3 and the processes described herein by executing program instructions stored in a computer readable storage medium, such as a memory (i.e., a computer memory, a hard disk, and/or the like). Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

The process starts in step 300. The password manager 103 receives, in step 302, the application/site name. For example, the password manager 103 may receive the app/site name from the app/site name field 202, via an Application Programming Interface (API) of the local application 105/website 120/network application 121, via a voice recognition system, and/or the like. The application/website name may be a URL of a website 120/network application 121.

The password manager 103 receives, in step 304, the user name. For example, the password manager 103 may receive the user name via the username field 201, via an Application Programming Interface (API) of the local application 105/website 120/network application 121, via a voice recognition system, and/or the like.

The password manager 103 receives, in step 306, a version number. For example, the password manager 103 may generate a new version number based on the user 106 setting the version radio button 204 to "Yes" as described in FIG. 2. The version number may also be manually entered.

The password manager 103 receives, in step 308, the global password. For example, the password manager 103 may receive the global password via the global password field 203, via a voice recognition system, and/or the like.

The password manager 103 converts, in step 310, the global password to a phonetic password. The global password is converted to a series of sounds (e.g., using the International Phonetic Alphabet (IPA)). For example, the phrase "Baa Baa Black Sheep" is converted to "bɑ: bɑ: blæk ʃ1:p".

The password manager 103 determines, in step 312, if the phonetic spelling is correct. Step 312 is where the text is played to the user 106 for the user 106 to verify if the phonetic sound is correct. Step 312 is an optional step that may not be implemented in some embodiments. If the phonetic spelling is not correct in step 312, the process goes back to step 308 and gets the global password. If the phonetic spelling is correct in step 312, the password manager 103 trims the global password in step 314. The password manager 103 trims the phonetic spelling to remove any white spaces etc. that do not have any significance in the way passwords are memorized. For example, based on the trimming step 314, the phonetic spelling will become "bɑ:bɑ:blækʃ1:p".

The password manager 103 performs an app/site password generation function in step 316. The app/site password generation function may be any function that generates a unique password for each application 105/121/website 120 using the app/site name and the global password (a global seed). For example, the password manager 103 can use a key derivation function ((KDF) e.g., see https://en.wikipedia.org/wiki/Key_derivation_function) that takes the app/site name and the trimmed global password (or untrimmed global password) as an input. In addition, the user name and/or version may also be an input to the KDF function (i.e., site/app password=KDF (user name+site/app name+global password+version). For example, the KDF of (jsmith, "microfocus.com", "bɑ: bɑ: blæk ʃ1:p", 1)="zTYZ2Q6?gaV}*]4@". As one would envision, different ways of generating a unique password may accomplished using various hashing algorithms/processes (e.g., Secure Hashing Algorithm (SHA), Message Digest (MD), and/or the like) and orders of the input data.

As part of step 316, the password generation function also includes using the password configuration parameters (e.g., those defined in the settings window 220) to generate the application/site password. For example, the KDF function can generate an output that will have specific types of characters, such as, those described in the settings window 220.

The app/site password is shown to the user 106 (e.g., in the App/Site field 206) in step 318 (i.e., generated by the password manager 103 for display). The user 106 may then copy the password to login to the application 105/121/website 120. The process then ends in step 320.

By changing the global password to a phonetic password and trimming the phonetic password, the password manager 103 is essentially making the global password "Baa Baa Black Sheep" easier to use and remember. For example, if the user 106 entered the phrase "Baa baa black sheep" (sheep is not capitalized) or "Ba Ba Black Sheep," (Ba missing an "a") each variation will generate the same phonetic password. This does not compromise security because a brute force attack on long strings dramatically shifts the odds against the attacker and minor variations in spellings do not compromise the overall security of the global password. The user 106 can now use the same global password for different applications 105/121 and/or websites 120. This process is still secure because, the KDF function/hashing algorithm is sensitive to even the smallest change of input and generates completely different password for each application 105/121/website 120. In addition, because the process uses the app/site name as an input to KDF/hashing function, even with the same global password, the actual app/site password is completely different. This distinction is a great benefit to the user 106 in dealing with passwords. For example, the phrase that the user 106 remembers could be "Baa Baa Black Sheep for personal use" This phrase generates a completely random password for Google™, Facebook™ and Apple™ accounts because the app/site name is different for each web site.

In one embodiment, the password manager 103 may automatically provide the app/site password and the user name to the application 105/121/website 120 as part of an automated login process. For example, the password manager 103 may automatically provide the user name and app/site password by automatically accessing an Application Programming Interface (API) of the application 105/121/website 120.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIVI926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
    a microprocessor; and
    a computer readable medium, coupled with the microprocessor and comprising microprocessor readable and executable instructions that, when executed by the microprocessor, cause the microprocessor to:
        receive a first application name, wherein the first application name represents a first computer application of a plurality of computer applications;
        receive a global password, wherein the global password is used as a seed to login to the plurality of computer applications;
        convert the global password to a phonetic password, wherein the global password is converted to the phonetic password using International Phonetic Alphabet (IPA);
        play the phonetic password;
        receive user input confirming that the phonetic password is correct;
        in response to confirming that the phonetic password is correct, generate a first application password for the first computer application of the plurality of computer applications based on the first application name and the phonetic password; and
        generate, for display, the first application password.

2. The system of claim 1, wherein generating the first application password is based on a key derivation function.

3. The system of claim 1, wherein converting the global password to the phonetic password further comprises trimming the global password.

4. The system of claim 1, wherein the microprocessor readable and executable instructions further cause the microprocessor to:
    generate a second application password for a second computer application of the plurality of computer applications based on a second application name and the phonetic password; and
    generate, for display, the second application password to a user.

5. The system of claim 4, wherein the first application password is generated based on a first set of password configuration parameters and the second application password is generated based on a second set of password configuration parameters, and wherein the first set of password configuration parameters is different from the second set of password configuration parameters.

6. The system of claim 1, wherein the first application password is generated based on a user name.

7. The system of claim 1, wherein the first application password is generated based on a version number.

8. The system of claim 1, wherein the microprocessor readable and executable instructions further cause the microprocessor to:
    automatically provide the first application password and a user name to the first computer application as part of a login process.

9. A method comprising:
    receiving, by a microprocessor, a first application name, wherein the first application name represents a first computer application of a plurality of computer applications;
    receiving, by the microprocessor, a global password, wherein the global password is used as a seed to login to the plurality of computer applications;
    converting, by the microprocessor, the global password to a phonetic password, wherein the global password is converted to the phonetic password using International Phonetic Alphabet (IPA);
    playing the phonetic password;
    receiving user input confirming that the phonetic password is correct;
    in response to confirming that the phonetic password is correct, generating, by the microprocessor, a first application password for the first computer application of the plurality of computer applications based on the first application name and the phonetic password; and
    generating, for display, the first application password.

10. The method of claim 9, wherein generating the first application password is based on a key derivation function.

11. The method of claim 9, wherein converting the global password to the phonetic password further comprises trimming the global password.

12. The method of claim 9, further comprising:
    generating a second application password for a second computer application of the plurality of computer applications based on a second application name and the phonetic password; and
    generating, for display, the second application password to a user.

13. The method of claim 12, wherein the first application password is generated based on a first set of password configuration parameters and the second application password is generated based on a second set of password configuration parameters, and wherein the first set of password configuration parameters is different from the second set of password configuration parameters.

14. The method of claim 9, wherein the first application password is generated based on a user name.

15. The method of claim 9, wherein the first application password is generated based on a version number.

16. The method of claim 9, further comprising:
    automatically providing the first application password and a user name to the first computer application as part of a login process.

17. A non-transient computer readable medium having stored thereon instructions that cause a microprocessor to execute a method, the method comprising instructions to:
    receive a first application name, wherein the first application name represents a first computer application of a plurality of computer applications;

receive a global password, wherein the global password is used as a seed to login to the plurality of computer applications;

convert the global password to a phonetic password, wherein the global password is converted to the phonetic password using International Phonetic Alphabet (IPA);

play the phonetic password;

receive user input confirming that the phonetic password is correct;

in response to confirming that the phonetic password is correct, generate a first application password for the first computer application of the plurality of computer applications based on the first application name and the phonetic password; and generate, for display, the first application password.

18. The non-transient computer readable medium of claim 17, wherein generating the first application password is based on a key derivation function.

19. The non-transient computer readable medium of claim 17, wherein the instructions further cause the microprocessor to:

generate a second application password for a second computer application of the plurality of computer applications based on a second application name and the phonetic password; and generate, for display, the second application password to a user.

20. The non-transient computer readable medium of claim 17, wherein the first application password is generated based on a user name and a version number.

* * * * *